United States Patent [19]

Smoot, III et al.

[11] Patent Number: 5,944,799
[45] Date of Patent: *Aug. 31, 1999

[54] STATE MACHINE BUS CONTROLLER PROVIDING FUNCTION AND TIMING PARAMETERS TO SATISFY REQUIREMENTS OF ASYNCHRONOUS BUS AND MORE THAN ONE TYPE OF DEVICE ON THE BUS

[75] Inventors: Charles H. Smoot, III, Orono; Ronald J. Larson, Minneapolis; Jeffry V. Herring, Bloomington, all of Minn.; Jean-Pierre Dupont, Chilly-Mazarin; Richard Matysiak, Orsay, both of France

[73] Assignee: Samsung Electronics Co., Ltd., Suwon, Rep. of Korea

[*] Notice: This patent is subject to a terminal disclaimer.

[21] Appl. No.: 08/876,926

[22] Filed: Jun. 16, 1997

Related U.S. Application Data

[63] Continuation of application No. 08/468,030, Jun. 6, 1995, Pat. No. 5,640,585, which is a continuation of application No. 07/686,280, Apr. 15, 1991, abandoned, which is a continuation of application No. 07/462,932, Jan. 2, 1990, abandoned, which is a continuation of application No. 07/154,641, Feb. 9, 1988, abandoned.

[51] Int. Cl.[6] .................................................. G06F 13/14
[52] U.S. Cl. ................................................. 710/8; 710/58
[58] Field of Search ...................................... 395/843, 868, 395/291, 301, 828, 878; 710/8, 58

[56] References Cited

U.S. PATENT DOCUMENTS 4,050,096  9/1977  Bennett et al. .......................... 364/200
4,245,300  1/1981  Kaufman et al. ........................ 364/200
4,263,650  4/1981  Bennett et al. .......................... 364/200
4,290,106  9/1981  Catiller et al. .......................... 364/200

(List continued on next page.)

FOREIGN PATENT DOCUMENTS 60-77255    5/1985   Japan .
60-254264  12/1985   Japan .
61-60159    3/1986   Japan .
63-65557    3/1988   Japan .

OTHER PUBLICATIONS

"Future Bus Anticipates Coming Needs", by J. Theus, et al., *Electronics International*, Jul. 1984, New York, pp. 108–112, vol. 57.

"Arbitration and Control Acquisition in the Proposed IEEE 896 Future Bus", by D.M. Taub, *IEEE Micro*, vol. 14, No. 4., Aug., 1984, pp. 28–41.

(List continued on next page.)

*Primary Examiner*—Thomas C. Lee
*Assistant Examiner*—David Ton
*Attorney, Agent, or Firm*—Knobbe, Martens, Olson & Bear, LLP

[57] ABSTRACT

A state machine bus controller for interfacing the CPU of a micro-computer based system with memory and I/O device is described. The controller, while capable of interfacing with a bus which is synchronous in nature, can maintain synchronous handshake with more than one type of microprocessor while providing function and timing parameters to satisfy requirements of an asynchronous bus and more than one type of device which reside on the bus.

4 Claims, 7 Drawing Sheets

U.S. PATENT DOCUMENTS

| | | | |
|---|---|---|---|
| 4,291,372 | 9/1981 | Forbes et al. | 364/200 |
| 4,292,667 | 9/1981 | Catiller et al. | 364/200 |
| 4,293,909 | 10/1981 | Catiller et al. | 364/200 |
| 4,301,505 | 11/1981 | Catiller et al. | 364/200 |
| 4,365,294 | 12/1982 | Stokken | 364/200 |
| 4,371,931 | 2/1983 | Catiller et al. | 364/200 |
| 4,374,416 | 2/1983 | Catiller et al. | 364/200 |
| 4,374,418 | 2/1983 | Catiller et al. | 364/200 |
| 4,379,328 | 4/1983 | Catiller et al. | 364/200 |
| 4,428,043 | 1/1984 | Catiller et al. | 364/200 |
| 4,430,710 | 2/1984 | Catiller et al. | 364/200 |
| 4,443,850 | 4/1984 | Harris | 395/843 |
| 4,456,970 | 6/1984 | Catiller et al. | 395/868 |
| 4,507,732 | 3/1985 | Catiller et al. | 364/200 |
| 4,514,647 | 4/1985 | Shoji | 307/269 |
| 4,563,738 | 1/1986 | Klan | 395/291 |
| 4,580,213 | 4/1986 | Hulett et al. | 364/200 |
| 4,590,551 | 5/1986 | Mathews | 364/200 |
| 4,608,661 | 8/1986 | Sasaki | 364/900 |
| 4,631,666 | 12/1986 | Harris et al. | 364/200 |
| 4,672,609 | 6/1987 | Humphrey et al. | 371/21 |
| 4,744,023 | 5/1988 | Welsch | 364/200 |
| 4,750,111 | 6/1988 | Crosby, Jr. et al. | 364/200 |
| 4,766,536 | 8/1988 | Wilson, Jr. et al. | 395/301 |
| 4,779,089 | 10/1988 | Theus | 364/200 |
| 4,837,681 | 6/1989 | Fuller | 364/200 |
| 4,845,712 | 7/1989 | Sanner et al. | 371/25 |
| 4,864,496 | 9/1989 | Triolo et al. | 364/200 |
| 4,888,684 | 12/1989 | Lilja et al. | 364/200 |
| 4,933,838 | 6/1990 | Elrod | 364/200 |

OTHER PUBLICATIONS

*Signetics*, "Field Programmable Logic Sequencer", 8ZS104 (O.C.)/82S10S (T.S.) pp. 4–12–4–21, Jan. 1983.

"82288 Bus Controller For IAPX 286 Processors", 1982, 1985, pp. 4–100 through 4–116.

*80386 Hardware Reference Manuary*, Intel, 1986.

"VME Bus Requester Releases Bus Four Ways", *Electrical Design News*, vol. 30, No. 18, Aug. 1985, pp. 241–242.

Chips and Technologies, Inc., "Interfacing the 80386 to Numeric Coprocessor Using Chips and Technologies 8230 CHIPSet™", Jul. 12, 1987.

Chips and Technologies, Inc., "CS8230: AT/386 CHIPSet™ Compatibility Test Report", Aug. 19, 1987.

The Winn L. Rosch Hardware Bible, Third Edition, by Winn L. Rosch, 1994, Brady Publishing.

"Speed Infusion" Part 3, by Ted Mirecki, *PC Tech Journal*, pp. 118–135, Jun. 1987.

"Speed Infusion", by Ted Mirecki, *PC Tech Journal*, pp. 126–155, Feb. 1987.

"Two High–Performance PC AT Compatibles", by John Unger, System Review, *BYTE*, Aug. 1987, pp. 207–211.

"The Tandy 4000", by Mark L. Van Name, *BYTE*, Feb. 1988, pp. 129–133, vol. 13. No. 2.

A printout of Business Wire, Inc., Oct. 13, 1986, pp. 165–167.

A printout of Business Wire, Inc., Feb. 1988, pp. 154–164.

P. 32 of *BYTE* Magazine, Jan. 1987.

"Compaq Spawns a New Generation", *PC World*, Nov. 1986, pp. 90–93.

Chips and Technologies, Inc. Common Stock Prospectus, Oct. 8, 1986.

"The No–Slot Alternative to Acceleration (And why It Makes Sense)", by Stephen Davis, *PC Magazine*, Sep. 16, 1986, pp. 169–178.

"Accelerator Board Power For A Price", by Charles Petzold, *PC Magazine*, Sep. 16, 1986, pp. 125–133.

*IBM Technical Disclosure Bulletin*, Sep. 1984, vol. 27, "Attachment of Slow RAM or Peripheral to a Single–Chip Microcomputer Without Ready Line".

Letter from Ronald J. Larson to Jon Orlick, Jun. 17, 1994.

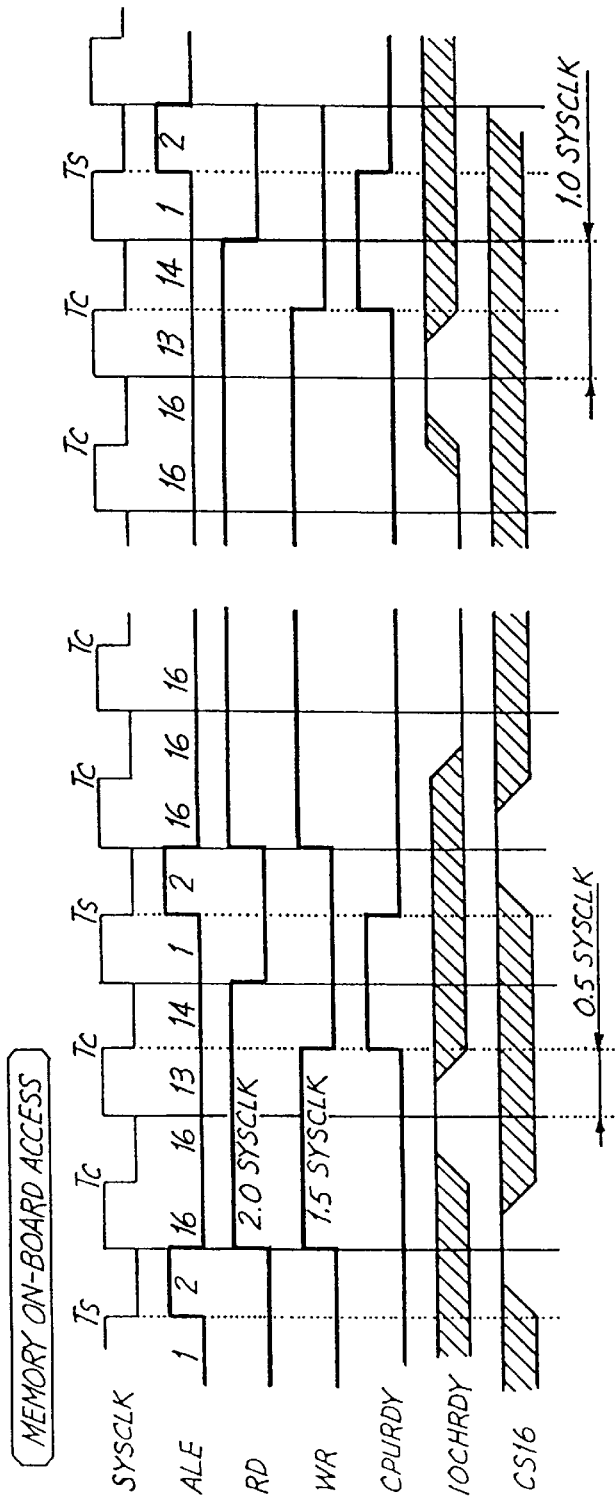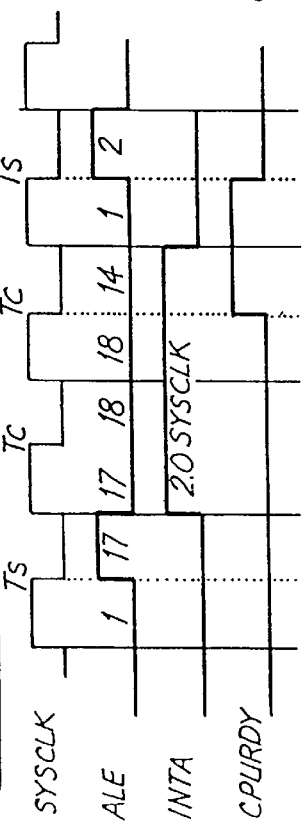
Fig. 4A
Fig. 4B

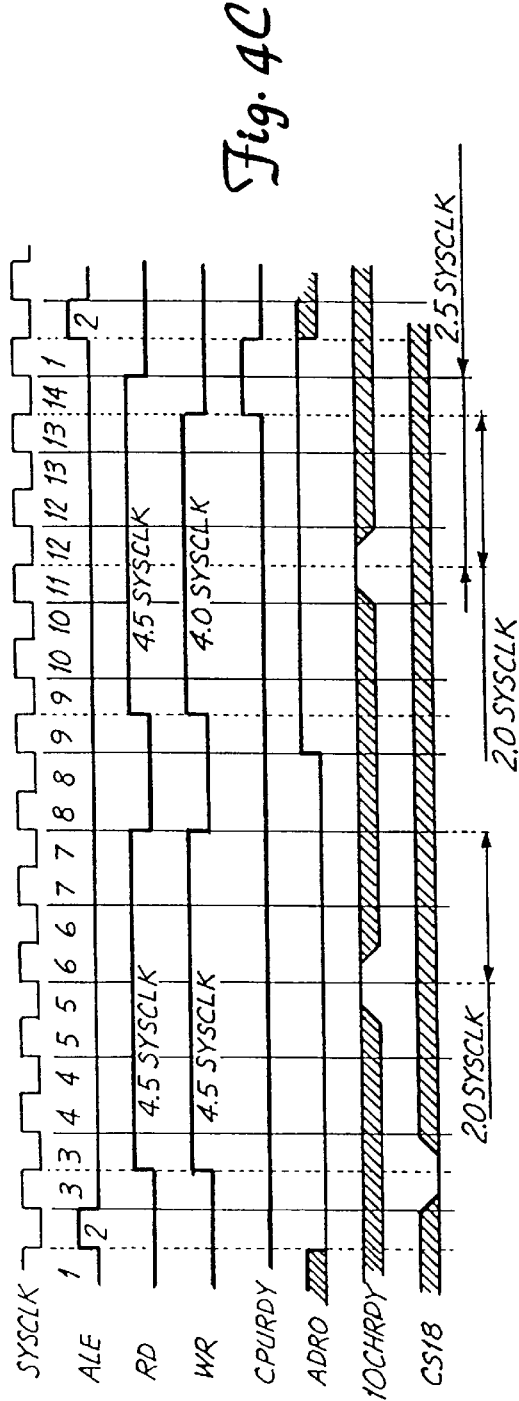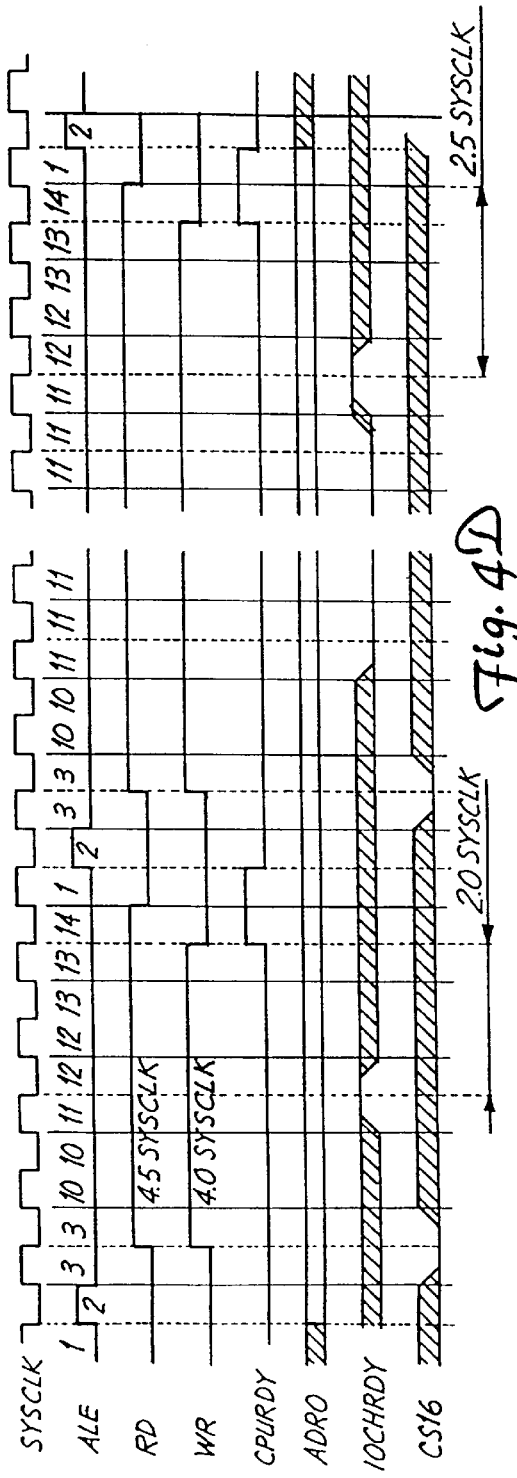

STATE MACHINE BUS CONTROLLER PROVIDING FUNCTION AND TIMING PARAMETERS TO SATISFY REQUIREMENTS OF ASYNCHRONOUS BUS AND MORE THAN ONE TYPE OF DEVICE ON THE BUS

This is a continuation of application Ser. No. 08/468,030, filed Jun. 6, 1995, now U.S. Pat. No. 5,640,585; which is a continuation of Ser. No. 07/686,280, filed Apr. 15, 1991, abandoned, which is a continuation of Ser. No. 07/462,932, filed Jan. 2, 1990, abandoned, which is a continuation of Ser. No. 07/154,641, filed Feb. 9, 1988, abandoned.

BACKGROUND AND SUMMARY OF THE INVENTION

The present invention relates to microprocessor bus controllers, and in particular, bus controllers which incorporate state machine technology for providing various bus operation types and bus timing variations.

In the past, bus controllers were integrated into and functioned as part of the microprocessor architecture. As microprocessor technology advanced, bus controller technology became separate and distinct. As the number of peripheral devices available for use with various microprocessors became available, it became obvious that peripheral devices usable with one integrated microprocessor bus controller architecture could not generally be used with the bus controller of another microprocessor.

Separate microprocessor and bus controller architectures provide system design flexibility, as well as facilitating interface of many peripheral devices among many different microprocessors. In the present state of the art, microprocessors are expected to interface with memory management units, CRT controllers, floppy disk controllers, hard disk controllers, arithmetic co-processors and the like. In addition, it is well known that the next generation of 32-bit microprocessors must be able to interface with already existing peripheral devices without the immediate need for specially designed bus controllers.

However, even though microprocessor and bus controller architectures are separated, bus controllers designed to interface with a specific type or range of types of microprocessors and peripheral devices are still limited to certain system configurations and further limit design flexibilities for the next generation of microprocessors. See, for example, the well-known personal computer models known as the "PC XT" and "PC AT", manufactured and sold by the IBM Corporation.

In the past, I/O bus structures in small micro-computer based systems comprised little more than buffered extensions of the microprocessor I/O pins. While microprocessor speeds, architecture and I/O protocols evolve at a rapid rate, system level I/O channel configurations remain essentially unchanged in structure and timing for 5 to 10 years. The present invention provides a simple means to accurately synthesize a given set of I/O bus protocols and timings which can be achieved with a wide spectrum of microprocessor types and speeds.

The state machine bus controller of the present invention enables designers to change the functionality of a controller bus quickly and inexpensively. While typically the control function is completely synchronous, whereby the microprocessor and bus may work in lock step, the design of the bus controller of the present invention is able to interface with a bus which is synchronous or asynchronous in nature, thus providing the flexibility to interface with more than one type of microprocessor at one interface, and more than one type of peripheral or memory devices at the other interface.

The state machine bus controller can maintain a synchronous protocol or handshake with the microprocessor (or CPU), while providing signals with sufficient function and timing parameters to satisfy the requirements of an asynchronous bus and various devices which can reside on the bus. While the use of a state machine within a bus controller provides the ability to change the function and timing of various signals quickly and easily, it also can provide the means to change the bus cycle functionality and timing (in a dynamic sense) owing to bus conditions or in response to specific access requests. Much of the way in which the bus controller of the present invention accomplishes the interface between the bus and the CPU is through the control of data path steering buffers commonly used in small microcomputer based systems.

State machine technology, generally, is well-known. See, for example:

Mealy, G. H.: A Method for Synthesizing Sequential Circuits, Bell System Tech. J., vol. 34, pp. 1045–1079, September 1955.

Moore, E. F., "Gedanken-experiments on Sequential Machines," pp. 129–153, Automata Studies, Princeton University Press, Princeton, N.J., 1956.

In the present invention, synchronous signals are generated by clocked flip flops and all of the feedback loops in the state machine are functions clocked at the same rate. The state machine uses the information which is available at the input of the bus controller as well as the current machine state, i.e. a derivative of what happened last in the state machine, to determine what the next machine state will be and what signals or functions to provide. Input information is received by the controller of the present invention from the microprocessor and from the device which the microprocessor is trying to access via the bus itself.

Information from the microprocessor starts an access cycle. Information returning from the accessed device via the bus can modify how the cycle proceeds and the timing of the cycle. The state machine also uses information returning from the accessed device, as well as the current state of the machine, to control the microprocessor. Finally, when the cycle is complete, the controller produces a signal, so notifying the microprocessor that it is ready for the next access request.

The state machine bus controller of the present invention can emulate the function of prior art bus controllers and anticipate the more and different functions of bus controllers of future systems. Since bus controllers generally are sequential in operation and provide finite numbers of bus operation types and timing variations thereof, bus control functions may be provided and controlled by a state machine. Owing to the flexibility of design based on state machine concepts, the bus controller of the present invention can change the direction of a path, jump to another path while in the middle of a current path as well as provide other system operational flexibilities described elsewhere in this application. Some bus signals which are not valid in the beginning of a cycle can be sampled later in the cycle when they become valid, thus changing the timing or function of that particular bus cycle. The state machine bus controller of the present invention generates both bus functions and the timing thereof.

DESCRIPTION OF THE DRAWING

FIGS. 4A–4F are timing diagrams for the bus operation types of FIG. 3.

DESCRIPTION OF THE PREFERRED EMBODIMENT

A computer processing unit (CPU) may access memory and I/O devices via a bus controlled by the bus controller of the present invention. Such CPUs may include microprocessors such as the model 80286 and 80386 manufactured and sold by Intel Corporation.

Figure 1A:
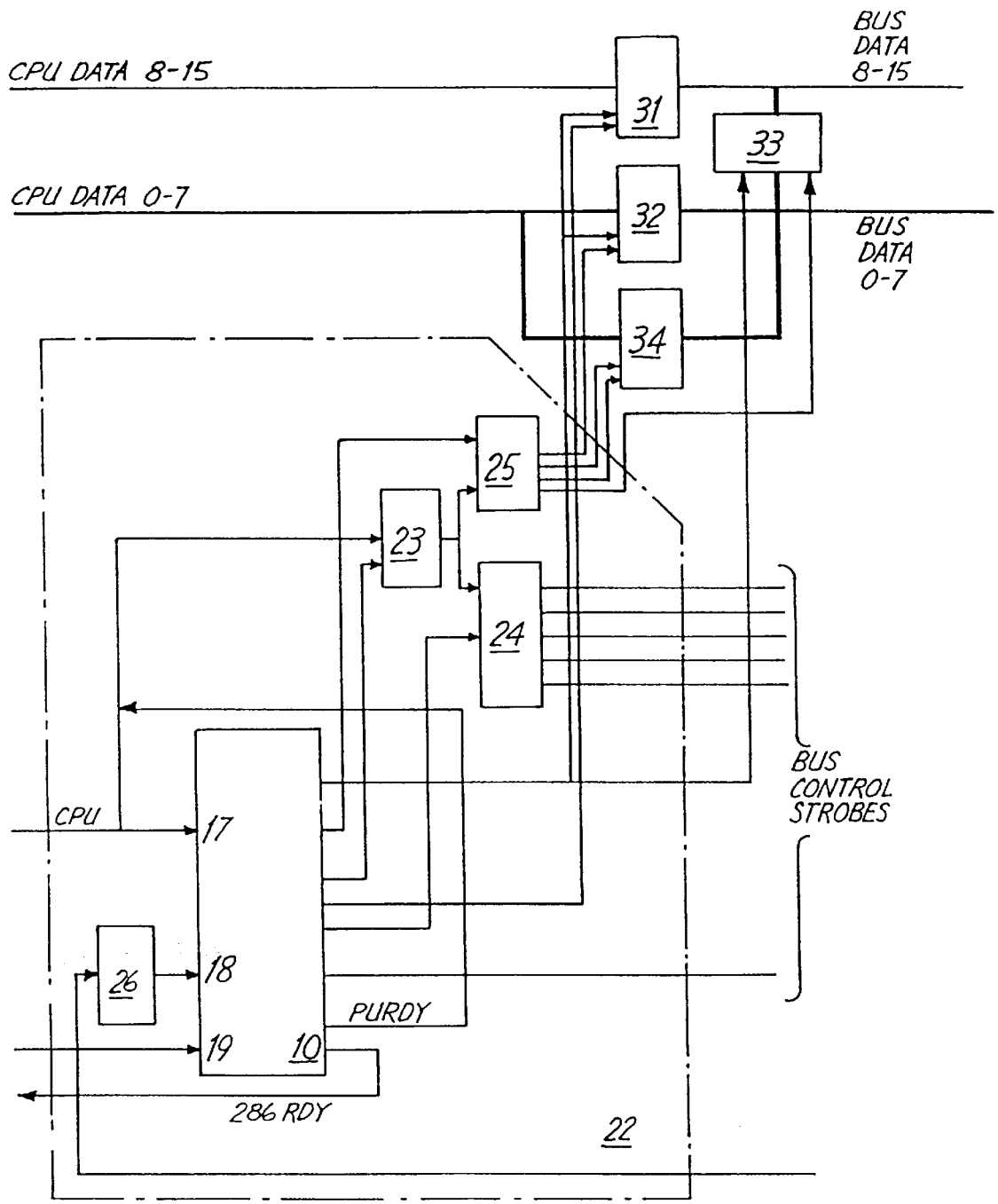
FIG. 1A is a block diagram of a state machine bus controller constructed according to the principles of the present invention.

A block diagram of state machine bus controller 22, constructed according to the principles of the present invention, is shown in FIG. 1A. Data path steering buffers 31–33 are typically identical, bidirectional buffers, such as type number 74F245, manufactured by Texas Instruments Corp. Data path steering buffer 34 is similar to buffers 31–33, except it is typically a unidirectional storage register, such a type number 74F374, also manufactured by Texas Instruments Corp. Buffers 31–34 are not part of the present invention but are shown for illustration purposes only.

With continuing reference to FIG. 1A, storage register 23 receives, stores and combines signals from the CPU and state machine 10 and may comprise Texas Instruments' type number 74F573. Programmable logic devices 24 and 25 comprise external logic for combining signals from the CPU and state machine 10 for providing state machine strobe signals, discussed elsewhere in this specification, and data path steering buffer control signals, respectively. Similarly, programmable logic device 26 conditions bus device response signals for interface with state machine 10. Programmable logic devices 24–26 may comprise programmable array logic, such as type number 16L8, manufactured by Monolithic Memories, Inc.

Figure 1B:
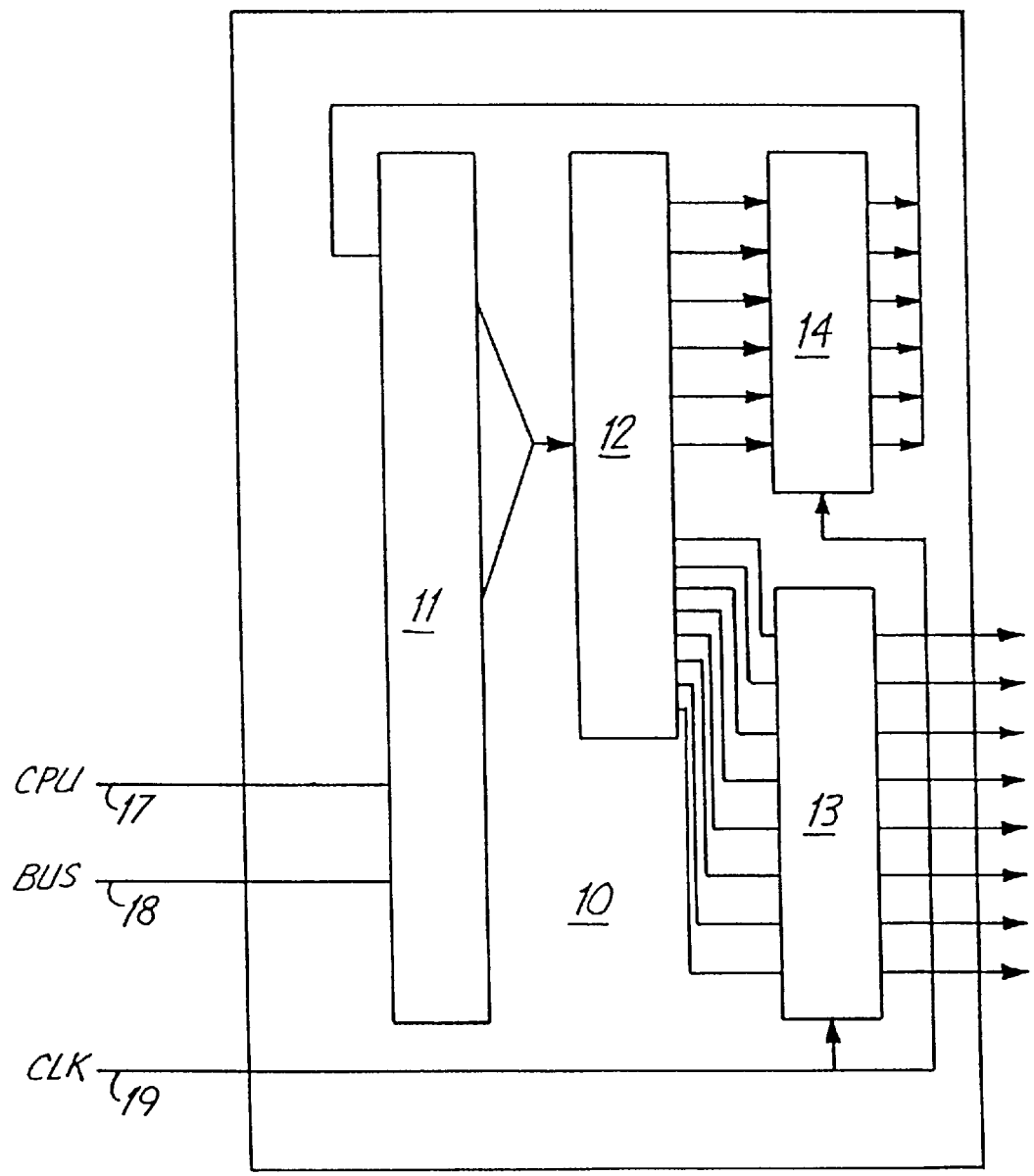
FIG. 1B is a block diagram of the state machine for the state machine controller of FIG. 1A.

Referring now to FIG. 1B, state machine 10 of the present invention includes combinatorial logic arrays 11 and 12. Combinatorial logic 11 is an AND-array, the outputs of which are represented by the intermediate terms listed in Table I. The output signals of combinational logic 11 are coupled to OR-array 12, which produces output signals described in the common product terms of Table II, which are coupled to storage element 14, described elsewhere in this specification. The remaining output signals produced by OR-array 12 are coupled to storage element 13 for producing external control signals defined by the common product terms of Table III. Bus control strobes, shown in FIG. 1A, are derived by storage element 13 and programmable logic device 24 in response to the external control signals defined in Table III and clock signal, CLK.

Figure 2:
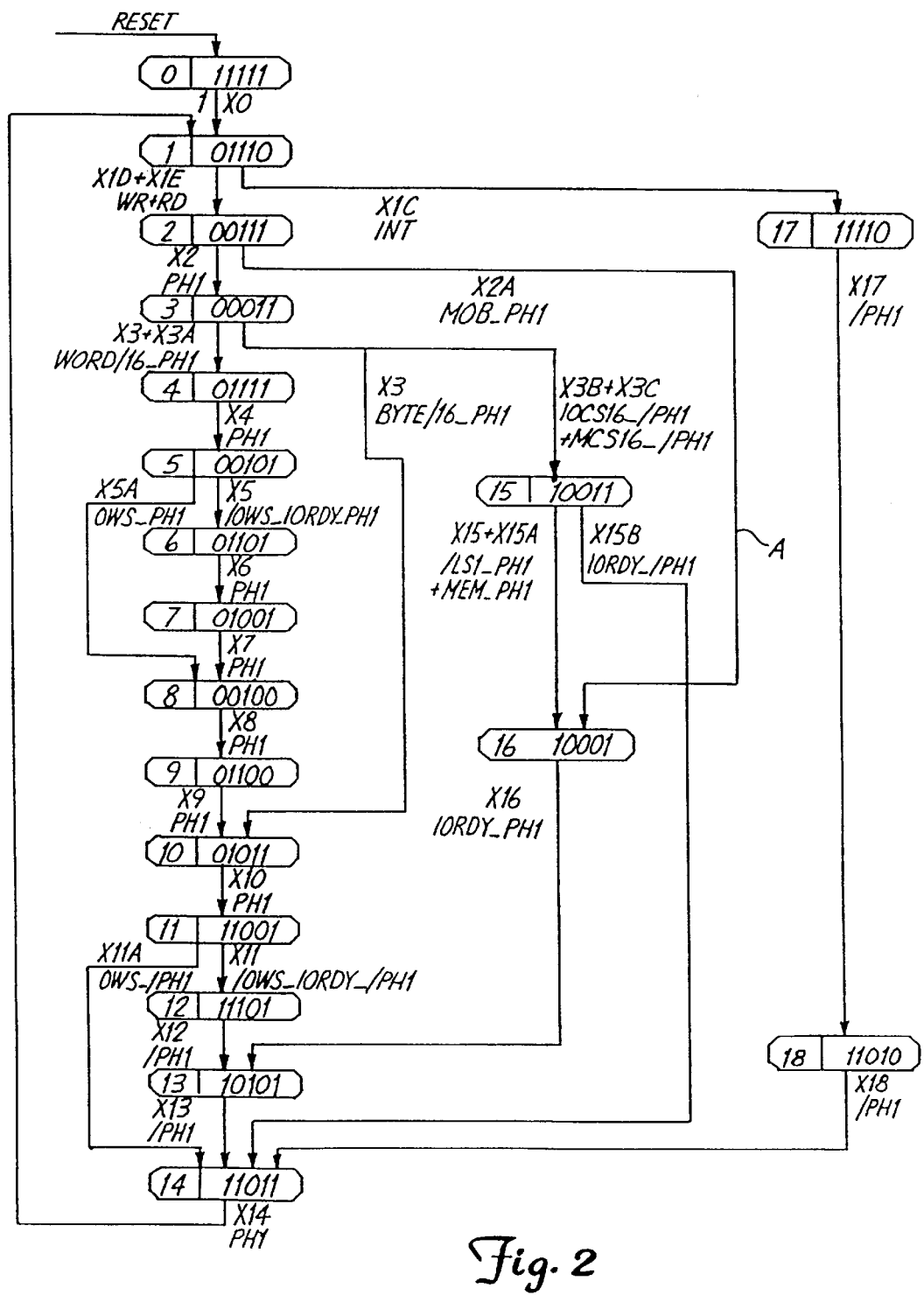
FIG. 2 is a state diagram for the state machine FIG. 1B.

Each step in the operation of storage elements 13 and 14 is governed by a common clock signal CLK applied at input 19. Each state in the flow of states in FIG. 2 is determined by the output signals defined by the equations of Table II, and the output signals of the storage element 13 described by the equations of Table III, and are modified by input vectors. Input vectors are produced from two different sources, one being the CPU or microprocessor and the other one is cycle return or bus device response signals from the bus applied to inputs 17 and 18, respectively.

A bus access cycle is initiated by the CPU. Once the cycle is initialized, the cycle proceeds according to the internal state of state machine 10, as determined by the equations of Tables II and III, as well input vectors from the bus. State machine 10 may be semiconductor device type number 82S105, manufactured by Signetics Semiconductor Products Division of North American Phillips, Inc.

In FIG. 2, the states and interrelationship of those states for the various bus function types provided by the bus controller of the present invention is shown. Each state is represented by an oval such as 21. Each state is a transient condition in a clocked flow of states for each CPU access cycle. Typically, the flow of states of the present invention, the flow does not revert to a previous state. Obviously, for some cases, the state machine can be programmed so that in fact the flow could return to a previous state without completing an access cycle. However, in this embodiment, an access cycle must be completed and each transient state that is left behind no longer exists.

While each state of state machine 10 is specified by one or more of the logic equations of Tables I, II and III, the state machine 10 will not advance until clock pulse CLK is applied. Once it has advanced, the conditions which made the previous state no longer exist. Thus, when a pulse of CLK signal is applied, all conditions change in the state machine, including bus signals and the output signals of Table I, II and III, which in turn advances controller 22 to the next state.

It should be noted that Table II indicates the set and reset conditions for the internal flip flops of state machine 10, and that such signals are each shown as only one output line in FIGS. 1A and 1B. Thus, each function type of the state machine bus controller of the present invention is defined by the intermediate terms of Table I, where each term is defined by the common product terms of Table II and III.

Where the set of equations given in Tables I, II and III provide a bus timing and protocol synthesis for a given combination of CPU speed and type, other equations can be generated to couple different combinations of CPU and I/O channel protocol timings. In practice, a given set of equations can be generated which can be configured to support multiple CPU speeds with dynamic switching.

Figure 3:
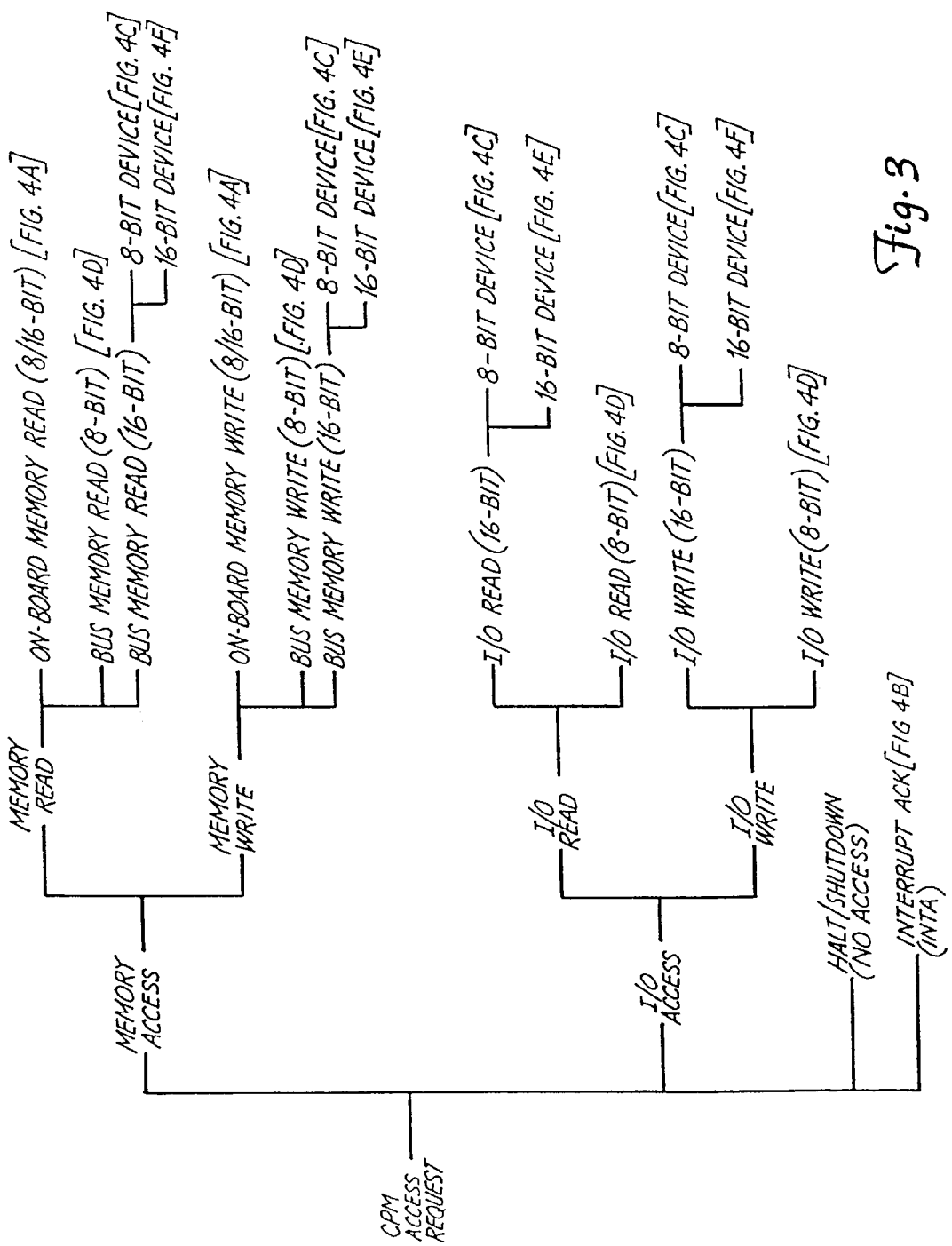
FIG. 3 illustrates the bus operation types provided to a microprocessor by the state machine bus controller of FIG. 1.

Referring now to FIG. 3, the types of CPU cycles controlled by bus controller 22, and their relationship to each other, is shown. Each memory access is either read or write. Similarly, each I/O access is either read or write. Each memory or I/O access cycle is further defined primarily by the number of bits in the word configuration of the access request and the device to be accessed, namely either 8 or 16 bits.

The duration, nature and timing of an access cycle will be according to nature of the request and of the device. Thus, if the request is an 8-bit access to an 8 bit device, or a 16-bit access to an 8-bit or 16-bit device, the cycle duration is different, typically less, than a 16-bit access to an 8-bit device or an 8-bit access to a 16-bit device. The difference arises from the difference between an 8-bit and a 16-bit CPU. If the CPU is a 16-bit device, typically even number address data is assigned to data bits 0–7, and odd number address data is assigned to data bits 8–15. However, in an 8-bit CPU, odd and even data bytes are processed successively as data bits 0–7. Therefore, state machine controller 22 steers data bits so that odd and even data bytes appear at the odd and even data byte assignments expected by a 16-bit CPU.

Where a 16-bit access to an 8-bit device is requested, state machine 10 of controller 22 translates the request by performing two separate cycles, one for each 8-bit byte, and requires more cycle time to assemble and present data to the CPU. Thus, the fact that the accessed device is different from access request is transparent to the CPU. While such translation is provided for both memory, on-board or otherwise, and I/O access cycles, the duration of such cycles is longer.

For CPUs using a microprocessor such as the Intel 80286, both 8-bit and 16-bit accesses can be made. When a 16-bit access is requested, the bits 0 through 15 are processed. Thereafter, controller 10 directs and controls data path steering buffers 31–34 which assemble and arrange them in the proper location required by the CPU for processing.

Referring again to FIG. 3, the interrupt acknowledge signal INTA, is the CPU's response to an interrupt which is produced by the interrupt controller. INTA may be considered a special case of the I/O READ function. The INTA signal generated by bus controller 22 causes the interrupt controllers to put an 8-bit value on the data bus, just as if the CPU requested an 8-bit I/O READ of an 8-bit I/O device. In the case of INTA, however, no valid addresses are presented, nor are they necessary, for the CPU, bus and the interrupt controllers to perform this access correctly.

With continuing reference to FIG. 3, halt/shutdown access actually involves no access on the bus. Therefore, no information is being written or read. The access request is used to avoid doing an I/O write or other access to a device when the CPU is really trying to simply halt or shut itself down. Without this access request, information that may be damaging, incorrect or erroneous could be inadvertently written. This function is provided by the state machine of the present invention to allow the CPU to reset itself as differentiated from re-setting the entire system, i.e., a power-up condition. The rest of the system logic remains operational and in the state that it was in at the time of the access and operational.

The nature, function and interface requirements, including relative timing, for CPU access request cycles, including interrupt acknowledge, halt/shutdown, I/O read/write, memory read/write, are all described in more detail in the manufacturer's description of the CPU. See, for example, part number 80286 and 80386. For such information, the designer may determine the kind of cycle request to use for the various types of accesses, and whether they should be 8-bit access or 16-bit access requests. The present invention will provide a response from the bus to indicate whether the device to be accessed is 8 or 16 bits and that determines also how the bus cycle proceeds.

Referring again to FIG. 2, all access cycles begin at state 1, and terminate at State 14. State 14 provides the CPU with a ready condition as defined by the set condition of logic equation 286RDY (see Table III).

While each access cycle terminates at state 14, some cycles may traverse more or fewer states than others. State machine 10 of controller 22 is clocked at the same rate as is the CPU, and changes state, i.e., from one state to the next, at the rate of the SYSCLK signal. However, all parameters for the next state in an access cycle must be present for state machine 10 to achieve the next state.

SYSCLK signal comprises 2 phases, PHI and /PHI, is one-half the frequency of CLK signal from which it is derived. SYSCLK is used to synchronize the phase of state machine 10 with the internal phase of the CPU. Each signal from state machine 10 listed in Table III is conditioned by SYSCLK phases. Therefore, for example, in order for state machine 10 to transition from state 16 to state 13 in access cycle A of FIG. 2, IOCHRDY must be present during PHI of the SYSCLK signal. Similarly, for state machine 10 to move from state 13 to state 14, X13 product term must wait for /PHI of the SYSCLK signal.

Figure 4E:
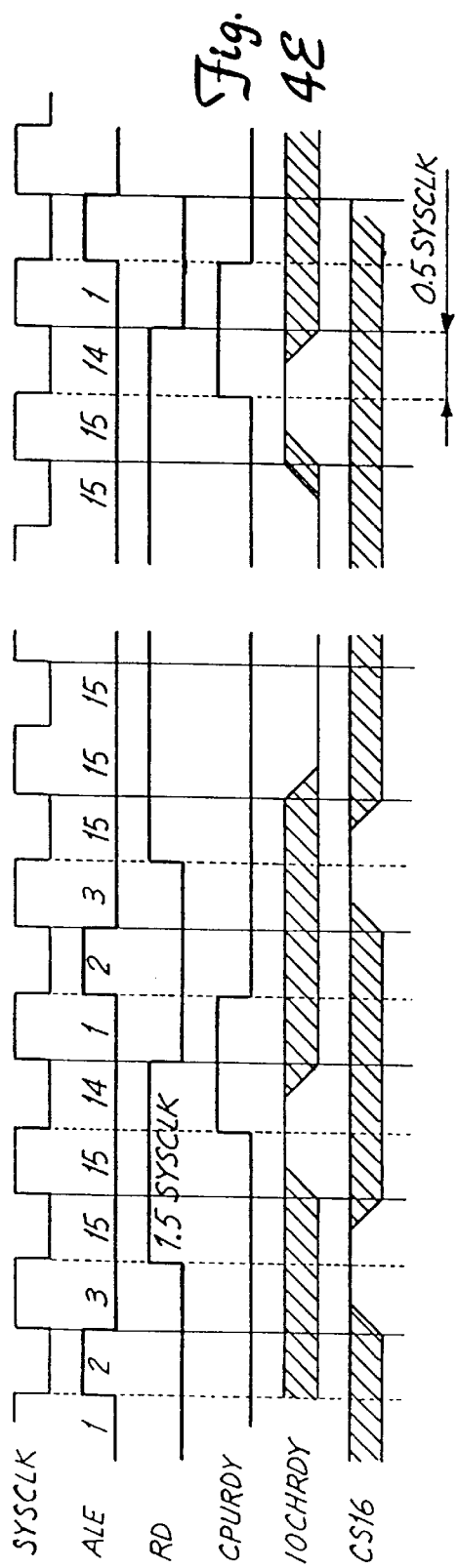

Referring now to FIG. 4A, the timing signals associated with access cycle A is shown for either a read or write on-board memory access request. Signals ALE, CPURDY, IOCHRDY are defined in Table III. The numbers 1, 12, 16, 13, 14, etc. along the time line for ALE signal are the numbers of the state of state machine controller 10, shown in FIG. 2. Control strobes RD and WR, i.e., read and write, respectively, which are produced by state machine controller 22 in response to a request from the CPU, are shown in the same figure for convenience only. It should be understood that only RD and WR are not asserted together as shown, but with one or the other is asserted at a given time. In the convention of FIGS. 4A and 4C–4F, the cross-hatched portion of signals IOCHRDY and CS16 indicates that the condition of the signals are irrelevant, i.e., it does not determine access cycle states for during that period of the bus cycle. One function of the IOCHRDY signal is to extend the access cycle time. Access cycle time is extended in increments of 0.5 SYSCLK to maintain lockstep with the CPU.

Referring again to FIG. 4A, ALE is Address Latch Enable, which is a function of the operation of the microprocessor system for controlling address information for the present bus access cycle. The ALE signal is generated by state machine 10. Signal 286RDY simply terminates the access cycle and is asserted during transition from state 14 to state 1 as shown in FIG. 4A.

CS16 signal is derived from signals returning from the on-board memory subsystem, the memory devices which reside on the bus, and the I/O devices which reside on the bus. The active state of the signal indicates the device accessed is 16-bits wide, (as opposed to 8-bits). The inactive state of the signal, when sampled at the appropriate time in the bus cycle, indicates that the device accessed is an 8-bit device.

Referring now to FIG. 4B, the timing of signals associated with access cycle request INTA of FIG. 3 is shown. In this access, the state machine 10 transitions from state 1 to state 14 via states 17 and 18. With reference to FIG. 4C, the timing of signals associated with a 16-bit access to an 8-bit device is illustrated. Here the access cycle provided by bus controller 10 is much longer and is depicted for both a read or write access. As before for FIG. 4A, only a read (RD) or write (WR) access is process at one time. For a 16-bit access to an 8-bit device, state machine 10 transitions from states 1 to 14 via states 2, 3, 4, 5, 6, 7, 8, 9, 10, 11, 12, and 13 as shown in FIG. 2. Signals ALE, CPURDY, ADR0 and IOCHRDY are defined in Table III, each having the intermediate terms defined in Table I as modified by the common product terms of state machine 10 defined in Table II.

In the access cycle of FIG. 4C, all transitions from one state to another require PHI of SYSCLK signal, except the transitions from state 1 to state 2 and from state 13 to state 14. Thus, state machine 10 waits for the required phase of SYSCLK before changing states. Also, since the CPU is trying to do a 16-bit access to an 8-bit device, CPU access request requires two bus controller cycles which are distinguished by the condition of the ADR0 signal.

ADR0 starts out low and is asserted as the transition from state 8 to state 9 to provide for the second 8-bit access At the end of the first 8-bit access and the second 8-bit access, the data can be assembled. The 16 full bits are then presented to the CPU and 286RDY signal is generated to end the CPU cycle.

It should be noted that the condition of ADR0 signal from the CPU is changed by state machine 10 of bus controller 22 for a 16-bit access to an 8-bit device. This change is necessary to provide the interface flexibility between such devices and various CPUs discussed elsewhere in this specification.

Referring now to FIG. 4D, the timing for signals associated with an 8-bit access to and 8-bit device is shown. State machine 10 of bus controller 22 transitions from state 1 to state 14 via states 3, 10, 11, 12 and 13. Again, both read and write access requests are shown, but not activated simultaneously.

Figure 4F:
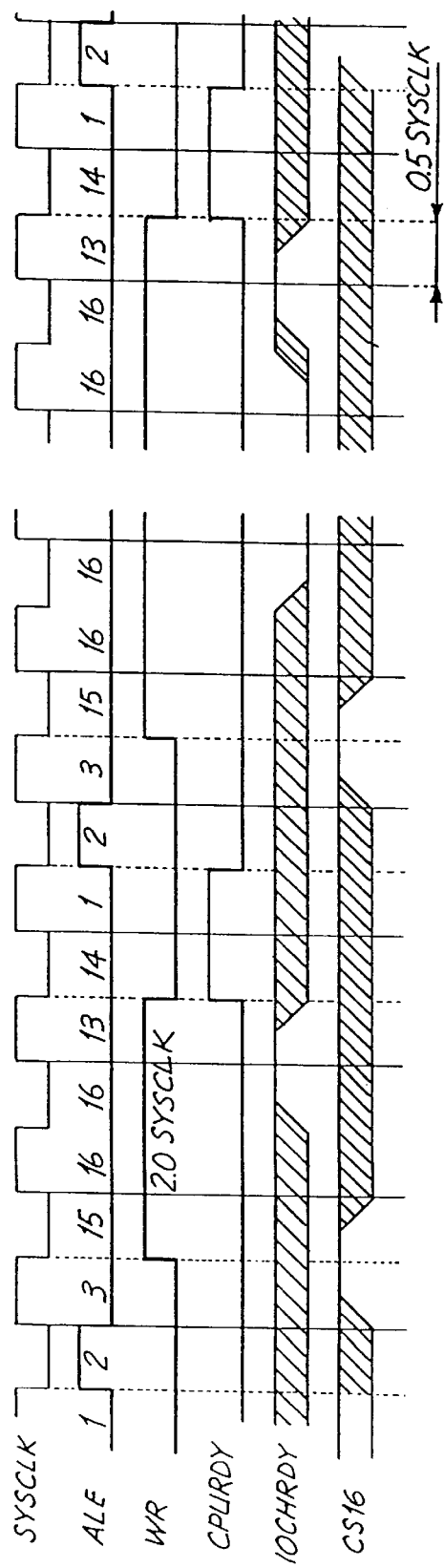

In FIG. 4E, timing for signals required for a 16-bit read access to a 16-bit memory or device is shown. In this access request, state machine 10 traverses from state 1 to state 14 via states 2, 3 and 15. Timing of signals necessary for a 16-bit write access to a 16-bit memory or device is shown in FIG. 4F. Here, state machine 10 completes the cycle from state 1 to state 14 via states 2, 3, 15, 16 and 13.

Referring again to FIG. 3, the timing diagram for each type of CPU access request is noted in brackets. Thus the timing diagram for a 16-bit access request to an 8-bit device is given in FIG. 4C.

With continuing reference to FIG. 3, a distinction is made between an access request to on-board memory and to bus memory because on-board memory refers to non-replacable memory devices supplied with the system incorporating the present invention, and bus memory refers to memory which may be replaced or added by the user. Thus, e.g., control strobes to bus memory must respect bus timing parameters and protocols, the same strobes to on-board memory need not so respect such parameter and protocols. Therefore, using the state machine controller of the present invention, the designer may, for example, provide for faster access request cycles for on-board memory access requests than for bus memory access requests and thereby improve overall system performance.

The state machine bus controller of the present invention is limited only by the speed at which state machine 10 can operate and the number of inputs, outputs and internal states it provides. Since state machine 10 of bus controller 22 of the present invention is clocked in lockstep with the CPU, if the CPU runs faster, state machine 10 also runs faster. However, the speed of the CPU may actually exceed the capability of the elements selected for state machine 10 to run as fast. In this event, however, state machine 10 may be reprogrammed so that more CPU cycles are required per bus cycle to achieve interface between state machine bus controller 22 of the present invention and a different CPU.

Where the speed of the CPU greatly exceeds the speed of state machine 10, different components may be selected or designed for state machine 10. Any state machine having the speed necessary and the number of inputs, outputs and internal states necessary to interface with faster and more complex CPUs may be used for state machine 10.

Where a given design for state machine is capable of running faster in order to interface to a faster CPU, the state machine equations of Tables I through III may remain unchanged. Where the speed of the CPU exceeds the capability of the elements of state machine 10 to run as fast, the state machine equations of Tables I through III must change to accommodate the faster CPU. Thus, the reprogramability of state machine bus controller 22 provides the designer with greater scope of design flexibility than in previous bus controller designs.

While the present invention has been particularly shown and described with respect to a preferred embodiment thereof, it would be understood by those skilled in the art that changes in form and detail may be made without departing from the spirit of the invention or exceeding the scope of the appended claims.

TABLE I

| | | |
|---|---|---|
| X0 | = | C4 * C3 * C2 * C1 * C0; |
| X1 | = | /C4 * C3 * C2 * C1 * /C0; |
| X1A | = | /C4 * C3 * C2 * C1 * /C0 * A0; |
| X1B | = | /C4 * C3 * C2 * C1 * /C0 * /A0; |
| X1C | = | /C4 * C3 * C2 * C1 * /C0 * S0 * S1; |
| X1D | = | /C4 * C3 * C2 * C1 * /C0 * S0 * /S1; |
| X1E | = | /C4 * C3 * C2 * C1 * /C0 * /S0 * S1; |
| X1F | = | /C4 * C3 * C2 * C1 * /C0 * /S0 * /S1; |
| X2 | = | /C4 * /C3 * C2 * C1 * C0 * PH1; |
| X2A | = | /C4 * /C3 * C2 * C1 * C0 * PH1 * MEM * MOB; |
| X2B | = | /C4 * /C3 * C2 * C1 * C0 * PH1 * BHE * A0 * /LS1; |
| X3 | = | /C4 * /C3 * /C2 * C1 * C0 * PH1; |
| X3A | = | /C4 * /C3 * /C2 * C1 * C0 * PH1 * BHE * /CA0; |
| X3B | = | /C4 * /C3 * /C2 * C1 * C0 * /PH1 * MEM * MCS16; |
| X3C | = | /C4 * /C3 * /C2 * C1 * C0 * /PH1; |
| X4 | = | /C4 * C3 * C2 * C1 * C0 * PH1; |
| X410 | = | /C4 * C3 *       C1 * C0 * /PH1 * /MEM * IOCS16; |
| X5 | = | /C4 * /C3 * C2 * /C1 * C0 * PH1 * /0WS * IORDY; |
| X5A | = | /C4 * /C3 * C2 * /C1 * C0 * PH1 * 0WS; |
| X6 | = | /C4 * C3 * C2 * /C1 * C0 * PH1; |
| X7 | = | /C4 * /C3 * /C2 * /C1 * C0 * PH1; |
| X8 | = | /C4 * /C3 * C2 * /C1 * /C0 * PH1; |
| X9 | = | /C4 * C3 * C2 * /C1 * /C0 * PH1; |
| X9A | = | /C4 * C3 * C2 * /C1 * /C0 * /PH1; |
| X10 | = | /C4 * C3 * /C2 * C1 * C0 * PH1; |
| X10A | = | /C4 * C3 * /C2 * C1 * C0 * * PH1 * BHE * CA0; |
| X11 | = | C4 * C3 * /C2 * /C1 * C0 * /PH1 * /0WS * IORDY; |
| X11A | = | C4 * C3 * /C2 * /C1 * C0 * /PH1 * 0WS; |
| X11B | = | C4 * C3 * /C2 * /C1 * C0 * /PH1 * 0WS * /LS1; |
| X12 | = | C4 * C3 * C2 * /C1 * * C0 * /PH1; |
| X13 | = | C4 * /C3 * C2 * /C1 * C0 * /PH1; |
| X13A | = | C4 * /C3 * C2 * /C1 * C0 * /PH1 * /LS1; |
| X14 | = | C4 * C3 * /C2 * C1 * C0 * PH1; |
| X14A | = | C4 * C3 */C2 * C1 * C0 * PH1 * LS1; |
| X15 | = | C4 * */C3 * /C2 * C1 ** C0 * PH1; |
| X16 | = | C4 * /C3 * /C2 * /C1 * C0 * PH1 * IORDY; |
| X17 | = | C4 * C3 * C2 * C1 * /C0 * /PH1; |
| X17A | = | C4 * C3 * C2 * C1 * /C0 * PH1; |
| X18 | = | C4 * C3 * /C2 * C1 * /C0 * /PH1; |

TABLE II

| | | |
|---|---|---|
| C0 | : | R = X0 + X5A + X7 + X14; |
| | | S = X1D + X1E + X9 + X18; |
| C1 | : | R = X2A + X4 + X10 + X15 + X410; |
| | | S = X9 + X11A + X13: |
| C2 | : | R = X2 + X6 + X9 + X13 + X17 + X410; |
| | | S = X3A + X7 + X11 + X14 + X16; |
| C3 | : | R = X1D + X1E + X4 + X7 + X12 + X410; |
| | | S = X3 + X5 + X8 + X13; |
| C4 | : | R = X0 + X14; |
| | | S = X1C + X2A + X3B + X10 + X410; |
| LS1 | : | R = X1D + X1F; |
| | | S = X0 + X1C + X1E; |

TABLE III

| | | |
|---|---|---|
| 286RDY | : | R = X11A + X13 + X18; |
| | | S = X0 + X1; |
| ALE | : | R = X0 + X2 + X17A; |
| | | S = X1C + X1D + X1E; |
| DT | : | R = X1C + X1E; |
| | | S = X0 + X14; |
| DEN | : | R = X1C + X1E + X1F + X14A; |
| | | S = XIO+ X2 + X17A; |
| CONEN | : | R = X0 + X5A + X7 + X11B + X13A + X14; |
| | | S = X2A + X3C + X9A + X17A; |
| 245E | : | R = X2B + X8 + X10A; |
| | | S = X0 + X1; |
| ADR0 | : | R = X0 + X1B; |
| | | S = X1A + X8; |
| PURDY | : | R = XIE; |
| | | S = X0; |

We claim:

1. A controller system for accessing a peripheral device coupled to a bus, the bus having corresponding bus operating parameters, wherein the peripheral device provides at least one response signal which indicates at least one peripheral operating parameter, said controller system comprising:

a clock signal having an associated clock period;

a processor which provides at least one access request signal to request access to the bus, said processor responsive to said clock;

a state machine coupled to receive said processor access request signal and the peripheral response signal, said state machine providing at least one control signal based on at least said processor access signal and the peripheral response signal; and at least a first programmable circuit which provides at least one variable bus control strobe based on at least said state machine control signal and said processor access request signal, said strobe having a duration related to at least one operating parameter of the peripheral device, the clock period, and the bus operating parameters.

2. The controller system of claim 1 further comprising a second programmable circuit coupled to said state machine and said processor, said second programmable circuit configured to provide control signals to a plurality of buffers to control the transfer of data between said processor and the peripheral device over the bus based on said access request signal.

3. A method of accessing a peripheral device coupled to a bus, the bus having corresponding bus operating parameters, wherein the peripheral device provides at least one response signal which indicates at least one peripheral operating parameter, said method comprising the steps of:

generating a clock signal having an associated clock period;

providing said clock signal to a processor;

generating at least one bus access request signal using said processor;

receiving said bus access request signal and the peripheral response signal at a state machine;

providing at least one control signal from said state machine, said control signal based on at least said processor access signal and the peripheral response signal; and providing at least one variable bus control strobe based on at least said state machine control signal and said processor access request signal using a programmable circuit, said strobe having a duration related to at least one operating parameter of the peripheral device, the clock period, and the bus operating parameters.

4. The method of accessing a peripheral device as defined in claim 3 further comprising the step of providing control signals to a plurality of buffers to control the transfer of data between said processor and the peripheral device over the bus based on at least said access request signal.

\* \* \* \* \*